(12) United States Patent
Gahm et al.

(10) Patent No.: US 9,148,386 B2
(45) Date of Patent: Sep. 29, 2015

(54) MANAGING BANDWIDTH ALLOCATION AMONG FLOWS THROUGH ASSIGNMENT OF DROP PRIORITY (71) Applicant: CISCO TECHNOLOGY, INC., San Jose, CA (US)

(72) Inventors: Joshua B. Gahm, Newtonville, MA (US); David R. Oran, Cambridge, MA (US); Zhi Li, Mountain View, CA (US); Rong Pan, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 109 days.

(21) Appl. No.: 13/873,589

(22) Filed: Apr. 30, 2013

(65) Prior Publication Data
US 2014/0321274 A1 Oct. 30, 2014

(51) Int. Cl.
*H04L 12/851* (2013.01)
*H04L 12/823* (2013.01)
*H04L 12/927* (2013.01)
*H04L 12/833* (2013.01)
*H04L 12/801* (2013.01)

(52) U.S. Cl.
CPC ............ *H04L 47/805* (2013.01); *H04L 47/193* (2013.01); *H04L 47/2408* (2013.01); *H04L 47/31* (2013.01); *H04L 47/32* (2013.01); *H04L 47/326* (2013.01)

(58) Field of Classification Search
None
See application file for complete search history.

(56) References Cited

U.S. PATENT DOCUMENTS

| 5,553,061 | A | 9/1996 | Waggener et al. |
|---|---|---|---|
| 6,167,030 | A | 12/2000 | Kilkki et al. |
| 6,493,386 | B1 | 12/2002 | Vetro et al. |
| 6,542,546 | B1 | 4/2003 | Vetro et al. |
| 6,804,198 | B1 | 10/2004 | Iwamoto |
| 7,245,586 | B2 | 7/2007 | Bitar et al. |
| 7,961,607 | B2 | 6/2011 | De Cnodder et al. |
| 8,301,982 | B2 | 10/2012 | Ver Steeg et al. |
| 8,903,411 | B1 | 12/2014 | Reeves et al. |
| 2001/0047517 | A1 | 11/2001 | Christopoulos et al. |
| 2003/0236904 | A1 | 12/2003 | Walpole |
| 2004/0186877 | A1 | 9/2004 | Wang et al. |
| 2007/0008986 | A1 | 1/2007 | Xie et al. |

(Continued)

FOREIGN PATENT DOCUMENTS

| EP | 1622385 | 2/2005 |
|---|---|---|
| WO | WO2006/004472 | 1/2006 |

(Continued)

OTHER PUBLICATIONS

Ibanez, J., et al., "Preliminary Simulation Evaluation of an Assured Service," IETF Internet Draft, <draft-ibanez-diffserv-assured-eval-oo.txt>, Aug. 1998, 20 pages http://tools.ietf.org/html/draft-ibanez-diffserv-assured-eval-00.

(Continued)

*Primary Examiner* — Awet Haile
(74) *Attorney, Agent, or Firm* — Patent Capital Group (57) ABSTRACT

A method is provided in one example embodiment and includes generating a transmission control protocol (TCP) flow; marking a plurality of packets of the TCP flow with one of two differentiated services code points (DSCPs) according to a proportion that is selected to control a throughput associated with the TCP flow; and communicating at least a portion of the plurality of packets to a network.

17 Claims, 5 Drawing Sheets

(56) References Cited

U.S. PATENT DOCUMENTS

| | | | |
|---|---|---|---|
| 2008/0025230 A1* | 1/2008 | Patel et al. | 370/252 |
| 2008/0123660 A1* | 5/2008 | Sammour et al. | 370/395.21 |
| 2008/0263219 A1 | 10/2008 | Bacchi et al. | |
| 2011/0072148 A1 | 3/2011 | Begen et al. | |
| 2011/0082924 A1 | 4/2011 | Gopalakrishnan | |
| 2011/0087794 A1 | 4/2011 | Li et al. | |
| 2011/0141885 A1 | 6/2011 | Chen | |
| 2011/0225303 A1* | 9/2011 | Engebretson | 709/227 |
| 2011/0289538 A1 | 11/2011 | Begen et al. | |
| 2012/0013748 A1 | 1/2012 | Stanwood et al. | |
| 2012/0106342 A1* | 5/2012 | Sundararajan et al. | 370/235 |
| 2012/0144288 A1 | 6/2012 | Caruso et al. | |
| 2012/0173594 A1 | 7/2012 | Jogand-Coulomb et al. | |
| 2012/0254456 A1 | 10/2012 | Visharam et al. | |
| 2013/0262693 A1 | 10/2013 | Phillips et al. | |

FOREIGN PATENT DOCUMENTS

| | | |
|---|---|---|
| WO | WO2011/015243 | 2/2011 |
| WO | WO2012/145108 | 10/2012 |
| WO | WO2013/116554 | 8/2013 |
| WO | WO2014/178996 | 11/2014 |
| WO | WO2015/054395 | 4/2015 |

OTHER PUBLICATIONS

Neglia, Giovanni, et al., "An Analytical Model of a new Packet Marking Algorithm for TCP Flows," Elsevier Science, Sep. 12, 2005, 28 pages http://www-sop.inria.fr/members/Giovanni.Neglia/publications/neglia06comnet.pdf.
U.S. Appl. No. 13/088,927, filed Apr. 11, 2011 entitled "System and Method for Data Streaming in a Computer Network," Inventors: Robert D. Major, et al.
U.S. Appl. No. 13/363,933, filed Feb. 1, 2012 entitled "System and Method to Reduce Stream Start-Up Delay for Adaptive ," Inventors: David R. Oran, et al.
U.S. Appl. No. 13/679,413, filed Nov. 16, 2012, entitled "System and Method for Providing Alignment of Multiple Transcoders for Adaptive Bitrate Streaming in a Network Environment," Inventors: Gary K. Shaffer, et al.
U.S. Appl. No. 13/869,811, filed Apr. 24, 2013, entitled "Size Prediction in Streaming Environments," Inventors: Matthew Francis Caulfield, et al.
USPTO Dec. 7, 2012 Non-Final Office Action from U.S. Appl. No. 13/088,927.
USPTO Mar. 7, 2013 Response to Dec. 7, 2012 Non-Final Office Action from U.S. Appl. No. 13/088,927.
USPTO Jul. 2, 2013 Final Office Action from U.S. Appl. No. 13/088,927.
USPTO Oct. 2, 2013 RCE Response to Jul. 2, 2013 Final Office Action from U.S. Appl. No. 13/088,927.
PCT Jun. 3, 2013 International Search Report and Written Opinion from International Application Serial No. PCT/US2013/024197 10 pages.
PCT—Jun. 14, 2012 International Search Report and Written Opinion from International Application Serial No. PCT/US2012/029691 10 pages.
USPTO Jul. 31, 2014 Final Office Action from U.S. Appl. No. 13/363,933.
PCT Aug. 5, 2014 International Preliminary Report on Patentability from International Application Serial No. PCT/US2013/024197 7 pages.
PCT Jul. 16, 2014 International Search Report and Written Opinion of the International Searching Authority from International Application Serial No. PCT/US2014/033058.
Krishnan, R., et al., "Traffic management models for http adaptive-streaming-aware CDN Interconnection," CDNI Internet Draft draft-krishnan-cdni-tm-has-00.txt; XP015086619, Jul. 30, 2012, 9 pages.
Shin, J., et al., "Content-Based Packet Video Forwarding Mechanism in Differentiated Service Networks," Proceedings of Packet Video Workshop '2000, Cagliari, Italy, May 2000; XP002317790, 10 pages http://www.gta.ufrj.br/diffserv/2000pv-diffvideo.pdf.
U.S. Appl. No. 14/051,234, filed Oct. 13, 2013, entitled "Virtual Assets for On-Demand Content Generation," Inventor(s) Mahesh Vittal Viveganandhan, et al.
Cisco Press Release, "Cisco and Service Providers Aim to Reinvent the TV Experience with Videoscape," Cisco Systems, Jan. 5, 2011, Las Vegas, NV http://newsroom.cisco.com/press-release-content?type=webcontent&articleId=5856789.
Adobe Systems Incorporated, "Flexible delivery of on-demand and live video streaming," © 2011, 3 pages, http://www.adobe.com/products/httpdynamicstreaming/.
Cisco Systems, "Videoscape Unity: The Future of Television," 2 pages [Retrieved and printed Oct. 2, 2013] http://www.cisco.com/en/US/netsol/ns1043/networking_solutions_market_segment_solution.html.
ISO/IEC 13818-1 International Standard, "Information Technology—Generic Coding of Moving Pictures and Associated Audio Information: Systems," Dec. 1, 2000, © ISO/IEC 2000; printed in Switzerland; 174 pages.
MPEG Transport Stream from Wikipedia, the free encyclopedia; 7 pages, Sep. 6, 2012 http://enwikipedia.org/wiki/MPEG_transport_stream.
MPEG-2 from Wikipedia, the free encyclopedia; 32 pages; Sep. 6, 2012 http://en.wikipedia.org/wiki/MPEG-2.
Pantos, R., "HTTP Live Streaming," Informational Internet Draft, Nov. 19, 2010, 23 pages, http://tools.ietf.org/html/draft-pantos-http-live-streaming-05.
Pantos, R., "HTTP Live Streaming," Informational Internet Draft, Sep. 30, 2011, 34 pages, http://tools.ietf.org/html/draft-pantos-http-live-streaming-07.
PCT—Oct. 22, 2013 International Preliminary Report on Patentability from International Application Serial No. PCT/US2012/029691 10 pages.
USPTO Nov. 8, 2013 Notice of Allowance from U.S. Appl. No. 13/088,927.
USPTO Jan. 16, 2014 Non-Final Office Action from U.S. Appl. No. 13/363,933.
USPTO Dec. 4, 2014 Non-Final Office Action from U.S. Appl. No. 13/363,933.
PCT Jan. 22, 2015 International Search Report and Written Opinion of the International Searching Authority from International Application Serial No. PCT/US2014/059709.
USPTO Jun. 3, 2014 Non-Final Office Action from U.S. Appl. No. 13/363,933.

* cited by examiner

MANAGING BANDWIDTH ALLOCATION AMONG FLOWS THROUGH ASSIGNMENT OF DROP PRIORITY

TECHNICAL FIELD

This disclosure relates in general to the field of communications and, more particularly, to a system, an apparatus, and a method for managing bandwidth allocation among flows through assignment of drop priority.

BACKGROUND

End users have more media and communications choices than ever before. A number of prominent technological trends are currently afoot (e.g., more computing devices, more online video services, more Internet video traffic), and these trends are changing the media delivery landscape. Separately, these trends are pushing the limits of capacity and, further, degrading the performance of video, where such degradation creates frustration amongst end users, content providers, and service providers. In many instances, the video data sought for delivery is dropped, fragmented, delayed, or simply unavailable to certain end users.

Adaptive Streaming is a technique used in streaming multimedia over computer networks. While in the past, most video streaming technologies used either file download, progressive download, or custom streaming protocols, most of today's adaptive streaming technologies are based on hypertext transfer protocol (HTTP). These technologies are designed to work efficiently over large distributed HTTP networks such as the Internet.

HTTP-based Adaptive Streaming (HAS) operates by tracking a user's bandwidth and CPU capacity, and then dynamically selecting an appropriate representation (e.g., bandwidth and resolution) among the available options to stream. Typically, HAS would leverage the use of an encoder that can encode a single source video at multiple bitrates and resolutions (e.g., representations), which can be representative of either constant bitrate encoding (CBR) or variable bitrate encoding (VBR). The player client can switch among the different encodings depending on available resources. Ideally, the result of these activities is little buffering, fast start times, and good video quality experiences for both high-bandwidth and low-bandwidth connections.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes generating a transmission control protocol (TCP) flow; marking a plurality of packets of the TCP flow with one of two differentiated services code points (DSCPs) according to a proportion that is selected to control a throughput associated with the TCP flow; and communicating at least a portion of the plurality of packets to a network. The term 'marking' in this context includes any activity associated with identifying, labeling, grouping, distinguishing, categorizing, or otherwise identifying any of the packets. In addition, the term 'control' is meant to include any activity associated with managing, regulating, confining, delineating, overseeing, or otherwise controlling a given parameter. In addition, the term 'throughput' is meant to include any object relating to bandwidth, capacity, output, etc. associated with any path (wired, wireless, satellite, etc.) to which a client device can utilize for receiving the video data.

In more detailed implementations, the two DSCPs reflect a HiDrop priority and a LoDrop priority that are to be used in conjunction with applying a weighted random early detect (WRED) protocol. In addition, particular packets within the HiDrop priority and the LoDrop priority share a single queue in a network element (e.g., a router). In one example instance, substantially all packets in the HiDrop priority would be dropped before any other packets in the LoDrop priority would be dropped. Additionally, at least some of the plurality of packets can be dropped according to a minimum value set for the Diffserv priority configured for the TCP flow.

Example Embodiments

Figure 1:
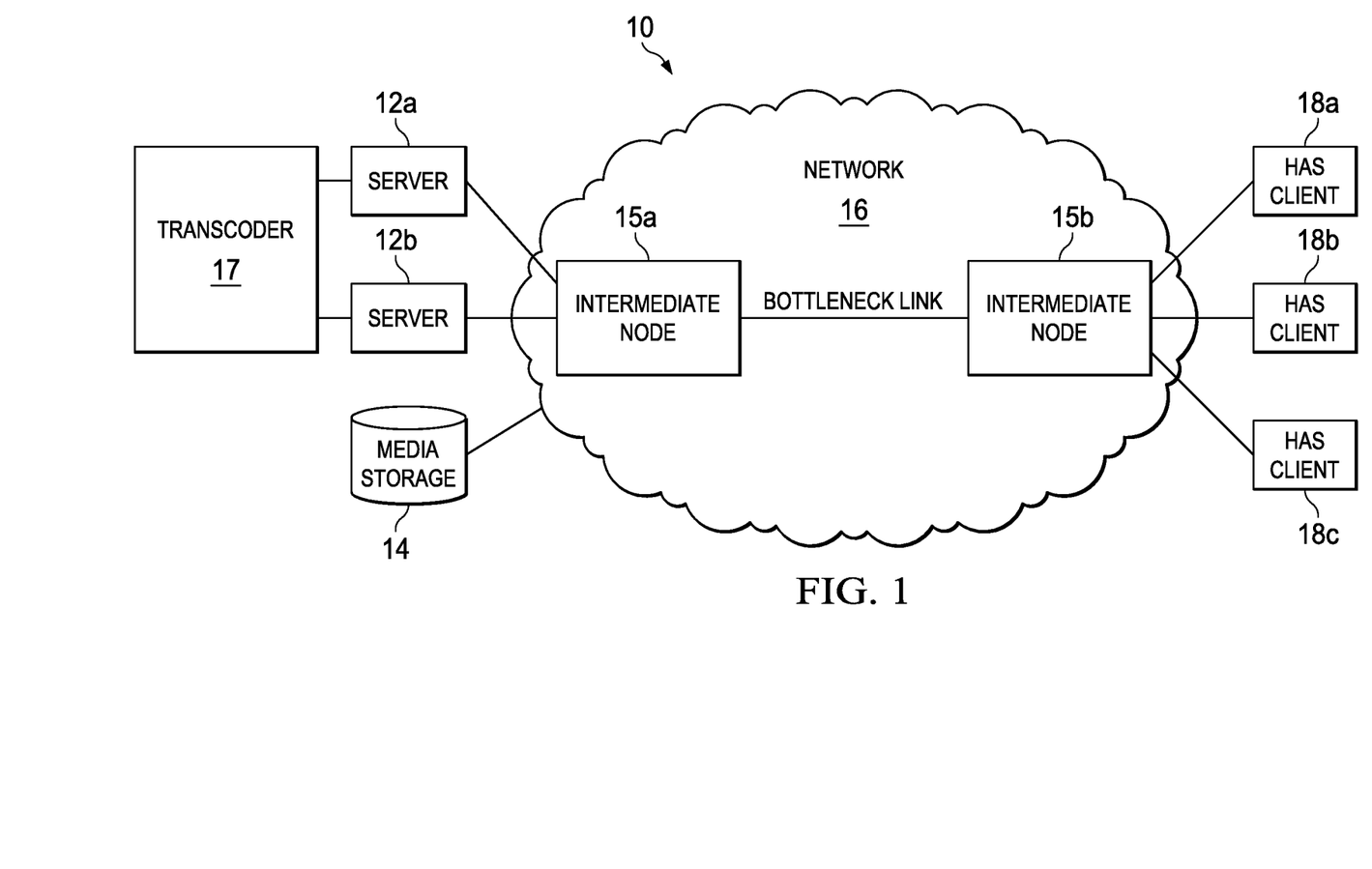
FIG. 1 is a simplified block diagram of a communication system for managing allocation among flows in adaptive streaming environments in accordance with one embodiment of the present disclosure.

Turning to FIG. 1, FIG. 1 is a simplified block diagram of a communication system 10 configured for managing bandwidth allocation among adaptive bit rate (ABR) flows through an assignment of drop priorities for a plurality of HAS clients in accordance with one embodiment of the present disclosure. Communication system 10 may include a plurality of servers 12a-b, a media storage 14, a network 16, a transcoder 17, a plurality of hypertext transfer protocol (HTTP)-based Adaptive Streaming (HAS) clients 18a-c, and a plurality of intermediate nodes 15a-b. Note that the originating video source may be a transcoder that takes a single encoded source and "transcodes" it into multiple rates, or it could be a "Primary" encoder that takes an original non-encoded video source and directly produces the multiple rates. Therefore, it should be understood that transcoder 17 is representative of any type of multi-rate encoder, transcoder, etc.

Servers 12a-b are configured to deliver requested content to HAS clients 18a-c. The content may include any suitable information and/or data that can propagate in the network (e.g., video, audio, media, any type of streaming information, etc.). Certain content may be stored in media storage 14, which can be located anywhere in the network. Media storage 14 may be a part of any Web server, logically connected to one of servers 12a-b, suitably accessed using network 16, etc. In general, communication system 10 can be configured to provide downloading and streaming capabilities associated with various data services. Communication system 10 can also offer the ability to manage content for mixed-media offerings, which may combine video, audio, games, applications, channels, and programs into digital media bundles.

In accordance with certain techniques of the present disclosure, the architecture of FIG. 1 can provide a way to allocate approximate bandwidth shares among competing ABR clients, correcting for biases due to round-trip time (RTT) diversity. Clients can specify (or at least, affect) their own bandwidth allocations by, for example, indicating a relative importance of their requests. This could involve using any number of weights associated with the request, as detailed below. Such a framework can offer any number of advantages. For example, certain embodiments of the present disclosure can leverage an existing packet-handling feature (e.g., weighted random early detect (WRED)), which is already widely deployed on existing network equipment and, further, widely accepted in existing networks. Additionally, the architecture can offer a flexible, approximate per-flow service differentiation without actually requiring any per-flow state in the network elements. Moreover, such a system could provide an allocation of bandwidth shares relative to other flows rather than dictating absolute bandwidth levels. Certain techniques discussed herein can offer considerable utility for ABR applications over a wide range of utilization levels, while requiring only minimal admission control to prevent gross overload of network resources.

In addition, teachings of the present disclosure can provide a generic, flexible technique that may be applicable to a wide range of applications within the ABR space. The architecture can also provide a way to enhance basic TCP fair-share even with RTT diversity. Moreover, it does not require multiple TCP connections per-client. In addition, unlike solutions that require the use of multiple TCP connections, it is possible to vary the bandwidth allocations in a continuous fashion. Note that such a bandwidth management paradigm can be deployed regardless of the underlying transport protocol's (e.g., TCP, SCTP, MPTCP, etc.) behavior. Note also that the mechanism described here may be used in different ways in different applications (such as the examples given below) to achieve different bandwidth management functions.

Before detailing these activities in more explicit terms, it is important to understand some of the bandwidth challenges encountered in a network that includes HAS clients. The following foundational information may be viewed as a basis from which the present disclosure may be properly explained. Adaptive streaming video systems make use of multi-rate video encoding and an elastic IP transport protocol suite (typically hypertext transfer protocol/transmission control protocol/Internet protocol (HTTP/TCP/IP), but could include other transports such as HTTP/SPDY/IP, etc.) to deliver high-quality streaming video to a multitude of simultaneous users under widely varying network conditions. These systems are typically employed for "over-the-top" video services, which accommodate varying quality of service over network paths.

In adaptive streaming, the source video is encoded such that the same content is available for streaming at a number of different rates (this can be via either multi-rate coding, such as H.264 AVC, or layered coding, such as H.264 SVC). The video can be divided into "chunks" of one or more group-of-pictures (GOP) (e.g., typically two (2) to ten (10) seconds of length). HAS clients can access chunks stored on servers (or produced in near real-time for live streaming) using a Web paradigm (e.g., HTTP GET operations over a TCP/IP transport), and they depend on the reliability, congestion control, and flow control features of TCP/IP for data delivery. HAS clients can indirectly observe the performance of the fetch operations by monitoring the delivery rate and/or the fill level of their buffers and, further, either upshift to a higher encoding rate to obtain better quality when bandwidth is available, or downshift in order to avoid buffer underruns and the consequent video stalls when available bandwidth decreases, or stay at the same rate if available bandwidth does not change. Compared to inelastic systems such as classic cable TV or broadcast services, adaptive streaming systems use significantly larger amounts of buffering to absorb the effects of varying bandwidth from the network.

In a typical scenario, HAS clients would fetch content from a network server in segments. Each segment can contain a portion of a program, typically comprising a few seconds of program content. [Note that the term 'segment' and 'chunk' are used interchangeably in this disclosure.] For each portion of the program, there are different segments available with higher and with lower encoding bitrates: segments at the higher encoding rates require more storage and more transmission bandwidth than the segments at the lower encoding rates. HAS clients adapt to changing network conditions by selecting higher or lower encoding rates for each segment requested, requesting segments from the higher encoding rates when more network bandwidth is available (and/or the client buffer is close to full), and requesting segments from the lower encoding rates when less network bandwidth is available (and/or the client buffer is close to empty).

When ABR clients compete with each other for bandwidth on a congested network, there are many situations in which it would be useful for the clients, network elements, and/or servers to be able to apportion the available network resources in predictable ways among the competing clients. In the simplest cases, it may be desirable to ensure that all clients receive an approximately equal share of the available network bandwidth, even though the path RTTs for the TCP connections to the different clients may vary. In other situations, it may be desirable that some clients receive a substantially larger share of bandwidth than others, either on an ongoing basis or only for a short period of time. Examples where unequal bandwidth allocation may be beneficial include:

1. One client is subscribed to a higher service tier than another, as in a gold/silver/bronze type of service. In this case, the client subscribed to the higher tier of service should receive more bandwidth.
2. One client is trying to rapidly fill its buffer before the start of playout or just after a channel change operation, whereas the other client already has a full buffer. In this case, the client trying to fill its buffer should get more bandwidth, thus enabling it to start playout sooner and/or shift to a higher encoding rate sooner than would otherwise be possible.
3. Due to the relative encoding characteristics of the scene being displayed by two different clients at the same time, one client might have a higher marginal benefit from additional bandwidth than another in terms of video quality. For example, a client currently displaying a high-motion, high-complexity scene, might have a large quality improvement from a slightly higher encoding/download rate whereas a client displaying a low-motion, low-complexity scene might have the maximum possible video quality already with a fairly low encoding rate. In this case, the client with the higher marginal utility of extra bandwidth should receive a larger share of the available bandwidth.

One objective of the present architecture is to provide a new, distributed mechanism by which the allocation of bandwidth among competing HTTP/TCP connections may be controlled. Although not limited to such, the mechanism disclosed herein is particularly well suited to use in ABR streaming applications. Furthermore, the framework provided makes use of quality of service (QoS) features that are already widely deployed on network elements and that are widely accepted and used by clients already.

Figure 2A:
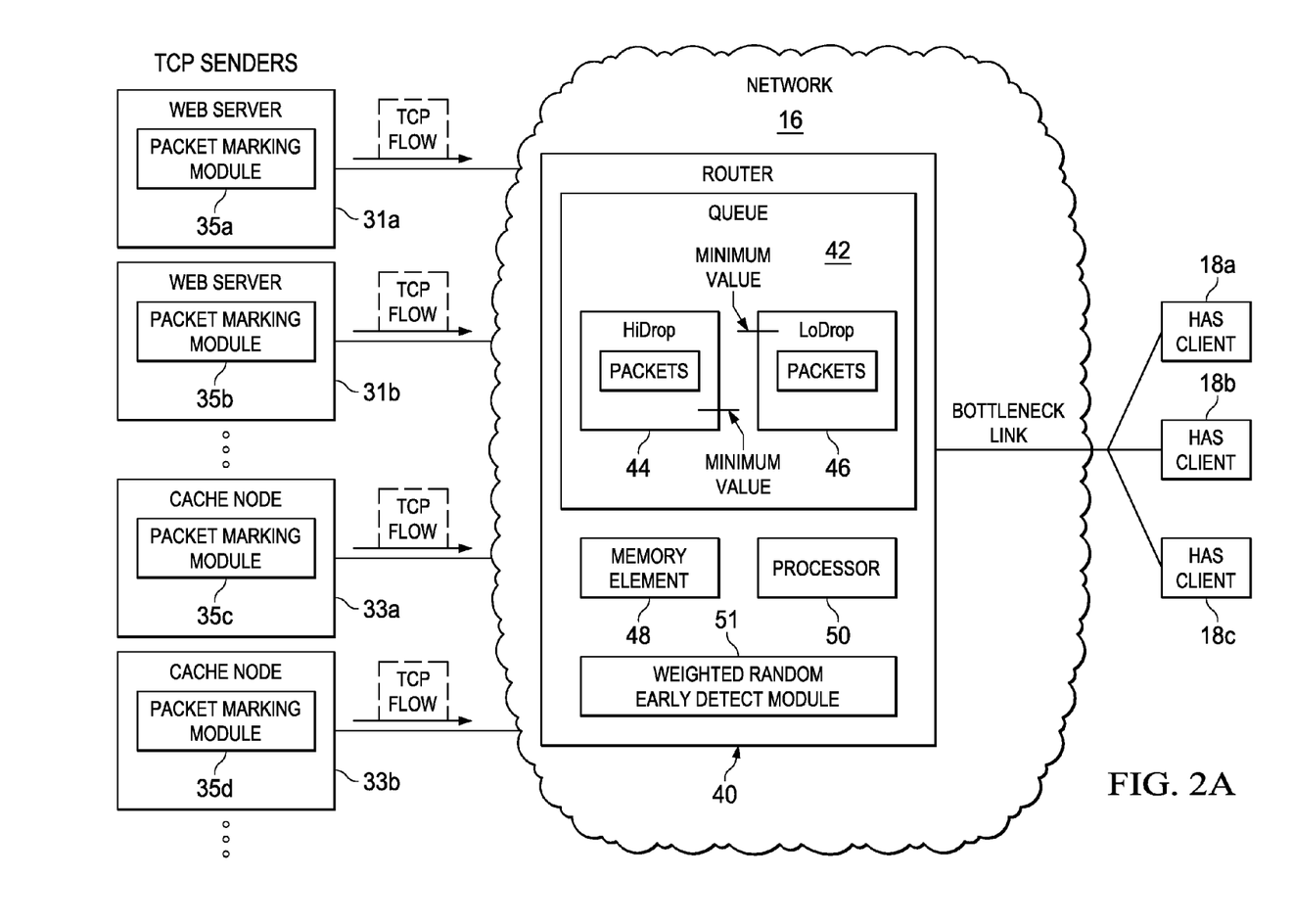
FIG. 2A is a simplified block diagram illustrating possible example details associated with particular scenarios involving the present disclosure.

Turning to FIG. 2A, FIG. 2A is a simplified block diagram illustrating one possible architecture that may be associated with the present disclosure. FIG. 2A illustrates a number of TCP senders, which include a plurality of web servers 31a-b, and a plurality of cache nodes 33a-b, where each of these elements has a corresponding packet marking module 35a-d. Note that TCP flows are propagating from these elements toward network 16, which includes a router 40. Router 40 illustrates a Diffserv class and associated queue 42 allowing for a HiDrop priority 44 and a LoDrop priority 46: each of which has a designated minimum value, which is further discussed below. Note that the term 'priority' in this context simply refers to (and includes) any type of organizational framework that permits the router to distinguish these two types of packets in the queue in some way. For example, this could include the use of any appropriate memory, storage space, queue, groupings, divisions, etc. Router 40 also includes a memory element 48, a processor 50, and a WRED module 51.

Weighted, Randomized Marking of Transmitted Packets with Different Drop Probabilities The architecture of FIG. 2A makes use of the WRED feature in routers, combined with randomly marking each transmitted packet of a TCP session with either of two differentiated services code points (DSCPs) within the same Diffserv priority. In this particular example, the two DSCP code points are HiDrop and LoDrop. The WRED configuration in the routers is assumed to be set such that:

(i) packets marked with HiDrop and LoDrop code points share a single queue;
(ii) packets of the HiDrop priority would be dropped before any packets of the LoDrop priority would be dropped. This might be done, for example, by setting the WRED q_min value for HiDrop to be substantially more than the q_min value for LoDrop, as is illustrated in FIG. 2A; and
(iii) q_max is approximately the same for both HiDrop and LoDrop.

With this configuration in the network, the TCP senders (typically web servers or cache nodes in example applications) are set up to mark each transmitted packet for a single TCP flow with either HiDrop or LoDrop, randomly and in a proportion that is fixed for that flow (or for a portion of that flow). Since TCP throughput for a single flow is responsive to the packet loss rate for the flow, the proportion of packets marked as HiDrop can have a large impact on the throughput of that flow.

To take a simple example, suppose that a server is sending two video fragments and assume for the moment that both fragments are being sent to the same destination so that RTT and the path are the same for the two flows. Then, assume that the server marks the packets from the first flow as HiDrop, but marks only ¼ of the packets from the second flow as HiDrop, with the remaining ¾ marked as LoDrop, choosing between HiDrop and LoDrop at random in this 1:3 ratio. Because the two flows share a common bottleneck link, and since packets marked as LoDrop will almost certainly not be dropped, packets from the first flow should see a drop probability that is approximately four times as large as packets from the second flow. Since TCP throughput is generally inversely proportional to sqrt(p_drop), the system expects the second flow to have twice the throughput of the first flow.

Note that the preceding simple example has been constructed with two additional considerations that are significant for the framework to work properly:

1. the traffic in the shared queue is TCP Friendly Rate Control (TFRC) traffic. (For example, DCCP would operate fine, as would RTP/UDP with TFRC; and
2. each TFRC flow in the queue should have at least some reasonable proportion of its packets marked as HiDrop.

These two additional considerations can ensure that packets from LoDrop will almost certainly not be dropped. Since the traffic is TFRC, dropping just a small percentage of packets from each flow can ensure that the overall throughput in the link would be controlled. Furthermore, requiring each separate TFRC flow to have a minimum percentage of HiDrop packets ensures that the throughput of each flow may be kept in check without dropping LoDrop packets from that flow.

One additional note is that even if packets from LoDrop priority were dropped on rare occasions, nothing detrimental would occur. The desired bandwidth shares may not be achieved among the flows for a brief period of time while this is happening, but when the framework is used to support ABR video, the resulting reduction in the system objective function may be fairly small.

Note that the system described herein is not bound strictly to using WRED. Any technique in the routers that would result in drop behavior in accordance with items (i) and (ii) above would also work well. Hence, new techniques for differential drop that are being developed could certainly leverage the teachings of the present disclosure.

Compensating for RTT Diversity

Within a managed network, with a bounded and known range of RTT values among the TCP flows of interest, it is possible to use the technique outlined above to achieve approximate fair-share of bandwidth even among flows with different round trip times. This would work as follows in example implementations of the present disclosure.

Assume that on the managed network, and among the flows of interest, there is a minimum RTT time of rtt_min and a maximum RTT time of rtt_max. Note that the RTT time for a particular TCP flow is a value that is known to the TCP sender (e.g., within its TCP stack). In addition, when TCP flows compete with each other for bandwidth at a bottleneck, they will typically share bandwidth approximately, in inverse proportion to their respective RTT values.

To compensate for the unequal bandwidth shares introduced by diverse RTTs, the TCP senders would set the fraction of packets marked with HiDrop in correct proportion to compensate for the effects of the longer RTTs. Specifically, and assuming favorable behavior of TCP throughput with respect to RTT and packet loss rates:

1. A flow with RTT of rtt_min (or less) would have all of its packets marked as HiDrop.
2. A flow with an RTT of rtt>rtt_min would have a fraction f_HiDrop=(rtt_min/rtt)**2 of its packets marked as HiDrop and the rest marked as LoDrop.

Assuming favorable behavior of throughput versus RTT and packet loss rate, the above mechanism should give an approximately equal throughput for competing TCP flows, wherever they compete at a bottleneck. Moreover, in a real scenario, the correction for RTT diversity may be somewhat more complex than suggested above. Furthermore, it is unlikely that the correction would work reliably over a wide range of RTT values. However:

1. The correction for RTT diversity does not need to apply over a wide range. In a managed network, there may often be situations where flows of interest originate from just a few locations and these locations are fairly close to the destination.

2. There is no reason to apply the formula given above exactly. Heuristics may be used to correct for errors for long or short RTT values for example, or even for different TCP stacks.
3. When this mechanism is used for managing the bandwidth flows to ABR clients, it is not necessary to be able to control or predict the bandwidth achieved by a given flow precisely or in a repeatable fashion. Since ABR clients are extremely efficient at compensating for bandwidth fluctuations through rate shifting, failure to control or predict the rate of a flow precisely will result in little impact in terms of quality of experience to the end user.

It should be noted that, even getting close to the desired results (most of the time) may provide measurable improvements. For example, consider two viewers of content on large screens, but one of them with an RTT that is 4× as long as the other. If the system does nothing, these two clients may split bandwidth in a ratio of 4:1, which could be undesirable for the losing client. If the system tries to correct the bandwidth shares to be 1:1, it may only achieve approximate result (e.g., 1.5:1). However, since rate-distortion curves are typically quite convex, sharing the bandwidth at 1.5:1 may still be a lot better than sharing the bandwidth at 4:1 ratio.

Note that since the RTT time for a TCP connection can vary considerably over the life of a TCP connection (due to varying queuing delays), the compensation for RTT diversity should be adjusted dynamically over the life of the TCP connection. To accomplish this, the sender can monitor changes in the estimated RTT value for the connection (as known to the TCP stack) and adjust the traffic shares in HiDrop and LoDrop accordingly.

One possible issue regarding the above technique is that if too high a fraction of the traffic is assigned to LoDrop, which would preferably be lossless, then that priority might become overwhelmed. Assuming, however, that every TCP flow has some reasonable fraction of traffic assigned to HiDrop, this would not be a concern. Since TCP throughput is dramatically reduced given only a small packet loss rate, the overall throughput of the link and, therefore, the load on the LoDrop priority, should be easily controlled by TCP congestion control provided that each flow has enough packets in HiDrop priority.

Introducing Intentional Unfairness

Certain example techniques of the previous section allow the system to establish approximate fair-share among competing TCP flows, even when there is RTT diversity among the flows (at least in a managed network scenario). One next logical step, for ABR applications, is to introduce intentional unfairness among the flows in a way that might be useful to ABR applications.

To change the relative bandwidth shares of the TCP flows according to their importance, the system can simply divide the fraction of packets assigned to HiDrop priority by another factor to reflect the relative importance of the flow. For example, if the system seeks to have flow A have twice the throughput of flow B, then after calculating the baseline fraction of packets for each flow that go into HiDrop in order to compensate for RTT diversity, the system would divide the HiDrop fraction for flow A by 4 so that it will have twice the throughput of flow B.

In ABR applications, it is typically the clients that have knowledge of the utility of more or less bandwidth in the delivery of the next content segment. Therefore, to allow the clients to drive the process of allocation of bandwidth shares, the system can introduce a signaling mechanism through which the client (receiver) can let the server (sender) know the relative weight that should be applied to the next transfer.

Figure 3:
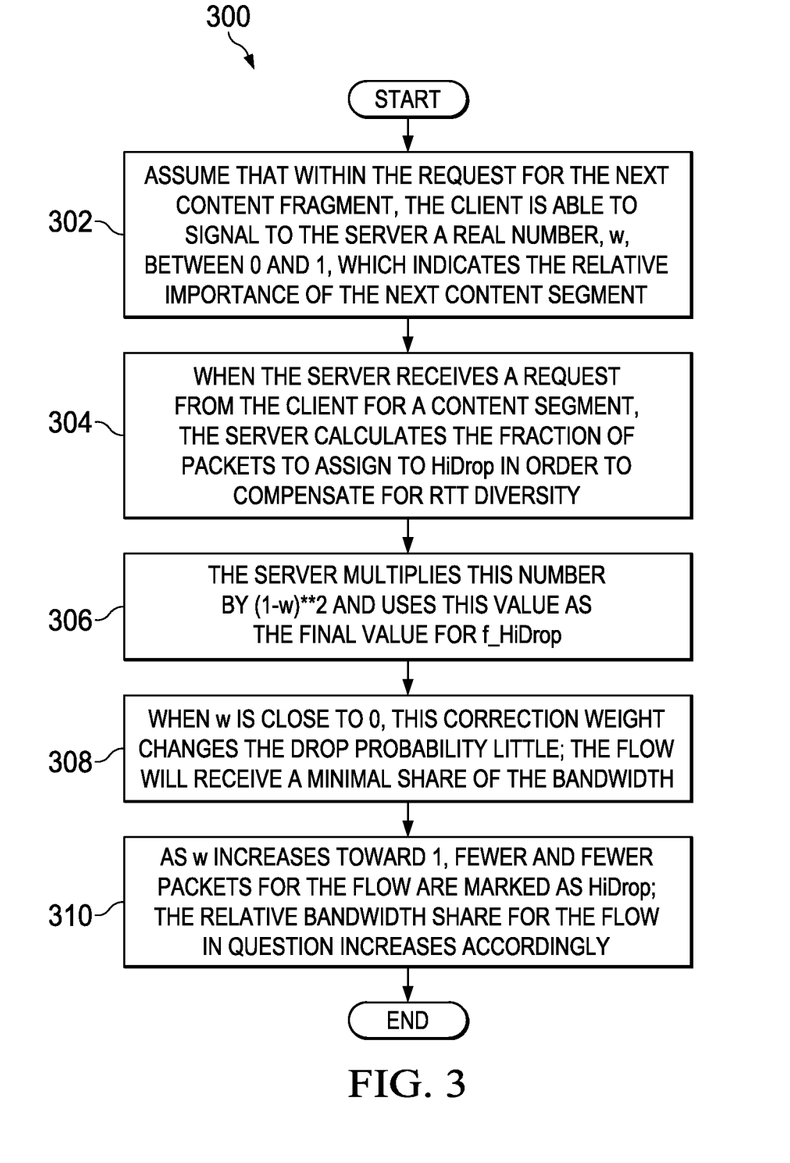
FIGS. 3-4 are simplified flowcharts illustrating potential operations associated with the communication system in accordance with certain embodiments of the present disclosure.

Turning to FIG. 3, FIG. 3 is a simplified flowchart 300 that can be used to help illustrate certain activities of the present disclosure. In one particular example, the system can assume that within the request for the next content fragment, the client is able to signal to the server a real number, w, between 0 and 1, which indicates the relative importance of the next content segment. This is generally indicated at 302. [Note that this designated importance characteristic can be assigned by any network element, provided by a client device itself, provided by administrator (or authoritative) device, etc.] At 304, when the server receives a request from the client for a content segment, the server first calculates the fraction of packets to assign to HiDrop in order to compensate for RTT diversity. Next, at 306, the server multiplies this number by (1-w)**2 and uses this value as the final value for f_HiDrop. (Note that in practice, some limit for w<1 could be applied to prevent any client from requesting an infinite share of the bandwidth.) At 308, when w is close to 0, this correction weight changes the drop probability little, and the flow will receive a minimal share of the bandwidth. As w increases toward 1, fewer and fewer packets for the flow are marked as HiDrop, and the relative bandwidth share for the flow in question increases accordingly. This is generally indicated at 310.

Any number of techniques may be used to embed the weight value within the fragment. An example implementation might incorporate the weight value within the URL of the request, with an application at the web server able to separate the weight value from the request (e.g., using a rewrite rule). Alternatively, the weight could be communicated using an HTTP extension header. Furthermore, any number of techniques may be used to indicate the relative bandwidth share and/or the relative probabilities with which packets are assigned to HiDrop and LoDrop priorities. The technique described here, where the importance of the next segment is signaled using a real number between 0 and 1, should be understood as one of many possible techniques through which the client can provide information to the server that will allow the server to set the fraction of packets assigned to each priority.

Relative vs. Absolute Bandwidth Shares

Note that the technique of this framework does not achieve allocation of guaranteed bandwidth to a flow, but instead allows clients to control their relative bandwidth shares with respect to other clients (and with respect to the bandwidth share levels also being requested by those other clients). The bandwidth that is actually allocated to each client can depend on how many other clients are also requesting bandwidth, along with the weights those clients assign to their requests. For example, if the system has two competing clients and each request a fragment with a weight of 0.25, then each will receive half the bandwidth of the bottleneck link. If the system uses these same two clients and adds a third client, with the third client requesting bandwidth with a weight of 0.5, then the first two clients will each receive ¼ of the link bandwidth while the third client will receive the remaining ½ of the bandwidth.

This allocation of bandwidth based on relative shares, as compared with competing client requests, makes the mechanism described here different from bandwidth allocation mechanisms that have been typically used in other platforms for media-based applications. For example, in other systems, allocation of bandwidth for media flows has often involved the request and allocation of a specific bit rate suitable for a desired media flow, with a hard reservation of resources along the path and/or exact accounting of resources against a pool.

While these "hard" reservations are widely employed for legacy media applications, the "relative share" allocations provided by the techniques of this framework are useful for ABR.

To offer an example, consider a legacy video application in which a client wishes to receive a video on demand (VoD) stream where the content is encoded at a constant rate of 3.75 Mbps. In this case, to achieve good Quality of Experience, the client and network should ensure that the stream receives a minimum of this fixed rate of 3.75 Mbps over its entire duration. Ensuring that this stream would receive, for example, twice as much bandwidth as some other stream would provide no value if that amount of bandwidth only turned out to be 3 Mbps instead of the requisite 3.75 Mbps.

In the case of for ABR, by contrast, consider a scenario where a "gold" client requests to receive twice as much bandwidth as a "silver" client, but without any exact knowledge of how much bandwidth it will actually get. During busy times, the gold client might receive 3 Mbps and the silver client might get 1.5 Mbps, while during less busy times the gold client might receive 10 Mbps, while the silver client might get 5 Mbps. Provided that the available bandwidth does not drop below some minimum level, these results might be quite acceptable and desirable for ABR, since the gold and silver clients can still provide an acceptable quality of experience (QoE) over quite a large range of available bandwidth. Note that even with ABR, some form of admission control is desirable in order to deny service to less important clients when the overall network load would cause some more important clients to drop below a minimum acceptable level of bandwidth.

Determination of Weight Values for Bandwidth Shares

In order to make use of this framework for the apportionment of bandwidth among clients, techniques can be implemented to set the weight values that ABR clients specify in their requests for content fragments. In the simplest cases, assigning fixed weights for clients in different situations provides significant utility. For example, a deployment may set a rule that "gold" clients systematically request a weight of 0.75, silver clients a weight of 0.5 and bronze clients a weight of 0, providing bandwidth shares of 4, 2 and 1 to gold, silver and bronze clients, respectively. These simple weight rules can be easily enhanced to allow for higher weights when a client's buffer is nearly empty, or depending on the type of device on which the content will be displayed (more weight for a bigger screen).

A slightly more complex method for setting the weights involves having clients dynamically adapt their requested weights in some form of "auction" (weights analogous to prices), with the goal of having the weights and resulting bandwidth shares eventually converge on a point at which the marginal utility for additional bandwidth for each client is equal, thus optimizing the global utility of the system.

Application of Framework for Allocation of Bandwidth Using a Rate-Distortion Model The following discussion illustrates how the technique of the present disclosure could be applied to allocate bandwidth among a group of competing ABR clients in accordance with a particular model of the form of Rate-Distortion curves for the content being displayed by the ABR clients.

Figure 4:
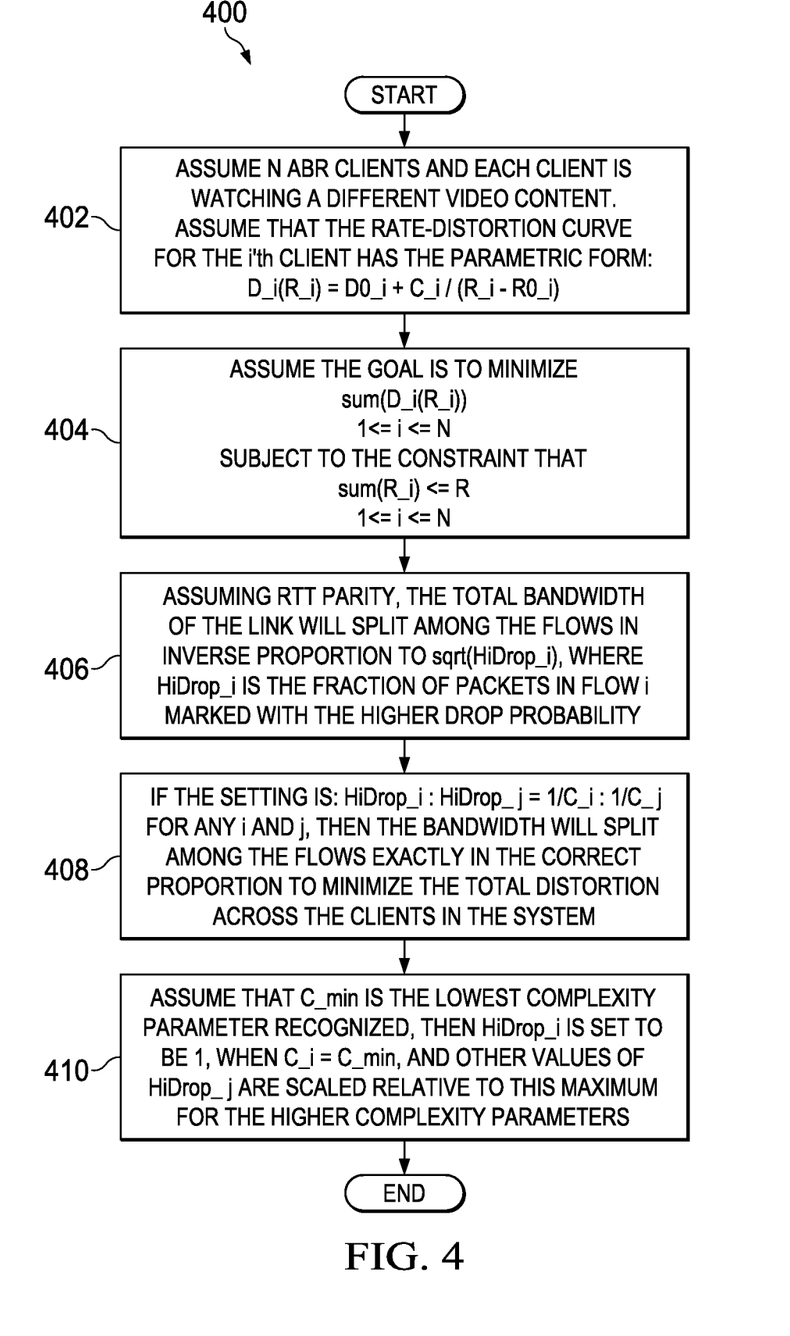

Turning to FIG. 4, FIG. 4 is a simplified flowchart 400 that can be used to help illustrate certain activities of the present disclosure. If an assumption is made (shown generally at 402) that there are N ABR clients and each client is watching a different video content, the Rate-Distortion curve for the i'th client has the parametric form:

$$D\_i(R\_i) = D0\_i + C\_i/(R\_i - R0\_i)$$

where R_i is the encoding rate for client i, D_i(R_i) is the distortion at encoding rate R_i, and (D0_i, C_i, R0_i) are parameters of the rate-distortion curve approximation for the client. Note that this is a commonly used parametric form for R-D curves. Also, note that in this form, the C_i parameter is intuitively a "complexity" parameter.

If we further assume that the system seeks to minimize (shown generally at 404):

$$sum(D\_i(R\_i))$$

$$1<=i<=N$$

subject to the constraint that:

$$sum(R\_i)<=R$$

$$1<=i<=N$$

where R is the total available bandwidth. It can be shown that if R0_i is small (as it usually is in these parametric forms) then the optimum allocation of bandwidth subject to the constraint occurs when, for any i, j, the ratio R_i:R_J is $$R\_i:RJ = sort(C\_i):sort(CJ)$$

Assuming RTT parity at 406, the total bandwidth of the link would split among the flows in inverse proportion to sort(HiDrop_i), where HiDrop_i is the fraction of packets in flow i marked with the higher drop probability. If the following is set:

$$HiDrop\_i:HiDrop\_j = 1/C\_i:1/CJ$$

for any i and j, then the bandwidth would split among the flows exactly in the correct proportion to minimize the total distortion across all of the clients in the system. This is generally shown at 408.

Assuming that C_min is the lowest complexity parameter being recognized, then the system can set HiDrop_i to be 1 when C_i=C_min, and scale all other values of HiDrop_j relative to this maximum for the higher complexity parameters. This is generally shown at 410.

Figure 2B:
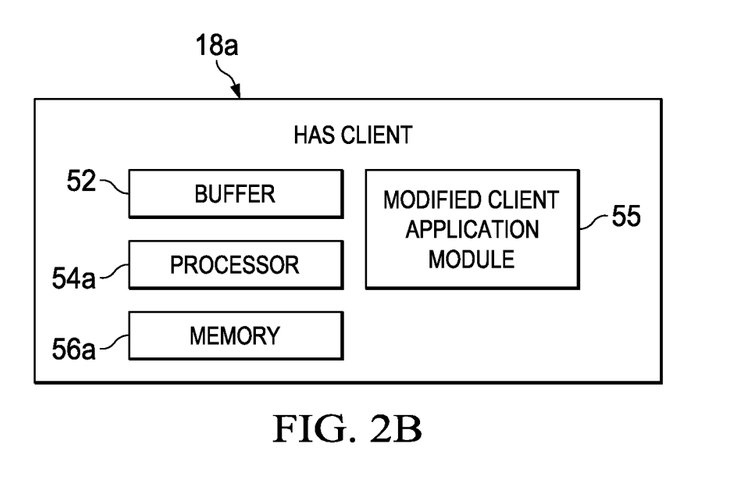
FIGS. 2B-2C are simplified block diagrams illustrating possible example details associated with an internal structure for one embodiment of the present disclosure.
Figure 2C:
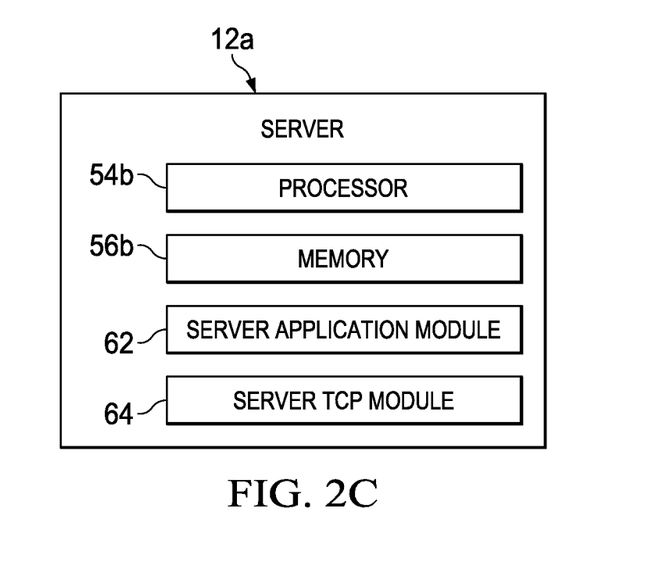

Referring briefly back to certain internal structure that could be used to accomplish the teachings of present disclosure, FIG. 2B is a simplified block diagram illustrating an example implementation of HAS client 18a. In this particular example, HAS client 18a includes a buffer 52, a processor 54a, a memory 56a, and a modified client application module 55. FIG. 2C illustrates one possible implementation of a server 12a that can include a processor 54b, a memory 56b, a server application module 62, and a server TCP module 64, which may be used to perform the probabilistic marking with HiDrop and LoDrop code points.

In terms of example components, infrastructure, etc. associated with the present disclosure, HAS clients 18a-c can be associated with devices, customers, or end users wishing to receive data or content in communication system 10 via some network. The term 'HAS client' is inclusive of devices used to initiate a communication, such as any type of receiver, a computer, a set-top box, an Internet radio device (IRD), a cell phone, a smartphone, a laptop, a tablet, a personal digital assistant (PDA), a Google Android™, an iPhonen™, an iPad™, or any other device, component, element, endpoint, or object capable of initiating voice, audio, video, media, or data exchanges within communication system 10. HAS clients 18a-c may also be inclusive of a suitable interface to the human user, such as a display, a keyboard, a touchpad, a remote control, or any other terminal equipment. HAS clients 18a-c may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, audio, or script data, or any type of source or object code, or any other suitable information in any appropriate format that may be communicated from one point to another.

Transcoder 17 (or a multi-bitrate encoder) is a network element configured for performing one or more encoding operations. For example, transcoder 17 can be configured to perform direct digital-to-digital data conversion of one encoding to another (e.g., such as for movie data files or audio files). This is typically done in cases where a target device (or workflow) does not support the format, or has a limited storage capacity that requires a reduced file size. In other cases, transcoder 17 is configured to convert incompatible or obsolete data to a better-supported or more modern format.

Network 16 represents a series of points or nodes of interconnected communication paths for receiving and transmitting packets of information that propagate through communication system 10. Network 16 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber-to-the-x (FTTx), which is a generic term for any broadband network architecture that uses optical fiber in last-mile architectures, and data over cable service interface specification (DOCSIS) cable television (CATV). The architecture can also operate in junction with any 3G/4G/LTE cellular wireless and WiFi/WiMAX environments. The architecture of the present disclosure may include a configuration capable of transmission control protocol/internet protocol (TCP/IP) communications for the transmission and/or reception of packets in a network.

In more general terms, HAS clients 18a-c, transcoder 17, and servers 12a-b are network elements that can facilitate the bandwidth allocation activities discussed herein. As used herein in this Specification, the term 'network element' is meant to encompass any of the aforementioned elements, as well as routers, switches, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, HAS clients 18a-c, transcoder 17 and/or servers 12a-b include software to achieve (or to foster) the bandwidth allocation activities discussed herein. This could include the implementation of instances of server application module 62, server TCP module 64, packet marking module 35a-d, and/or any other suitable element that would foster the activities discussed herein. Additionally, each of these elements can have an internal structure (e.g., a processor, a memory element, etc.) to facilitate some of the operations described herein. In other embodiments, these bandwidth allocation activities may be executed externally to these elements, or included in some other network element to achieve the intended functionality. Alternatively, HAS clients 18a-c, transcoder 17, and servers 12a-b may include software (or reciprocating software) that can coordinate with other network elements in order to achieve the bandwidth allocation activities described herein. In still other embodiments, one or several devices may include any suitable algorithms, hardware, software, components, modules, interfaces, or objects that facilitate the operations thereof.

In certain alternative embodiments, the bandwidth allocation techniques of the present disclosure can be incorporated into a proxy server, web proxy, cache, content delivery network (CDN), etc. This could involve, for example, instances of server application module 62 and/or server TCP module 64 and/or packet marking module 35a-d being provisioned in these elements. Alternatively, simple messaging or signaling can be exchanged between an HAS client and these elements in order to carry out the activities discussed herein.

In operation, a CDN can provide bandwidth-efficient delivery of content to HAS clients 18a-c or other endpoints, including set-top boxes, personal computers, game consoles, smartphones, tablet devices, iPads™, iPhones™, Google Droids™, Microsoft Surfaces™, customer premises equipment, or any other suitable endpoint. Note that servers 12a-b (previously identified in FIG. 1) may also be integrated with or coupled to an edge cache, gateway, CDN, or any other network element. In certain embodiments, servers 12a-b may be integrated with customer premises equipment (CPE), such as a residential gateway (RG).

As identified previously, a network element can include software (e.g., server application module 62, server TCP module 64, packet marking module 35a-d, etc.) to achieve the bandwidth allocation operations, as outlined herein in this document. In certain example implementations, the bandwidth allocation functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by a processor [processors 24a shown in FIG. 1C], or other similar machine, etc.). In some of these instances, a memory element [memory 26a shown in FIG. 1C] can store data used for the operations described herein. This includes the memory element being able to store instructions (e.g., software, code, etc.) that are executed to carry out the activities described in this Specification. The processor (e.g., processors 24a) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the bandwidth allocation activities, as outlined herein. Additionally, each of these devices may include a processor that can execute software or an algorithm to perform the bandwidth allocation activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that while the preceding descriptions have addressed certain ABR management techniques, it is imperative to note that the present disclosure can be applicable to other protocols and technologies (e.g., Microsoft Smooth™ Streaming (HSS™) Apple HTTP Live Streaming (HLS™), Adobe Zeri™ (HDS), Silverlight™, etc.). In addition, yet another example application that could be used in conjunction with the present disclosure is Dynamic Adaptive Streaming over HTTP (DASH), which is a multimedia streaming technology that could readily benefit from the techniques of the present disclosure. DASH is an adaptive streaming technology, where a multimedia file is partitioned into one or more segments and delivered to a client using HTTP. A media presentation description (MPD) can be used to describe segment information (e.g., timing, URL, media characteristics such as video resolution and bitrates). Segments can contain any media data and could be rather large. DASH is codec agnostic. One or more representations (i.e., versions at different resolutions or bitrates) of multimedia files are typically available, and selection can be made based on network conditions, device capabilities, and user preferences to effectively enable adaptive streaming. In these cases, communication system 10 could perform appropriate bandwidth allocation based on the individual needs of clients, servers, etc.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its techniques) are readily scalable and, further, can accommodate a large number of components, as well as more complicated/sophisticated arrangements and configurations. Accordingly, the examples provided should not limit the scope or inhibit the broad techniques of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   generating a transmission control protocol (TCP) flow;
   marking a plurality of packets of the TCP flow with one of two differentiated services code points (DSCPs) according to a proportion that is selected to control a throughput associated with the TCP flow, the marking comprising:
      when it is determined that a round-trip time (RTT) value for the TCP flow is less than or equal to a threshold value, marking all of the plurality of packets with a first DSCP of the two DSCPs,
      when it is determined that the RTT value for the TCP flow is greater than the threshold value, marking only a fraction of the plurality of packets with the first DSCP of the two DSCPs, and
      wherein the two DSCPs reflect a HiDrop priority and a LoDrop priority within a Diffsery priority; and
   communicating at least a portion of the plurality of packets to a network.

2. The method of claim 1, wherein particular packets within the HiDrop priority and the LoDrop priority share a single queue in a network element.

3. The method of claim 1, wherein substantially more packets in the HiDrop priority would be dropped before any other packets in the LoDrop priority would be dropped.

4. The method of claim 1, wherein at least some of the plurality of packets are dropped according to a minimum value set for the HiDrop priority and the LoDrop priority.

5. The method of claim 1, wherein heuristics are used to adjust the marking to correct for errors for certain RTT values associated with one or more TCP flows.

6. The method of claim 1, wherein heuristics are used to adjust the marking based on particular TCP stacks.

7. The method of claim 1, wherein relative bandwidth shares for a plurality of TCP flows are changed according to a designated importance characteristic, and wherein another fraction of packets assigned to the HiDrop priority is divided by another factor to reflect a relative importance of a particular flow.

8. The method of claim 1, wherein a requested bandwidth weight is received at a server from a client in order to alert the server about a relative weight to be applied to a bandwidth characteristic for a next data transfer.

9. The method of claim 8, wherein one or more clients receive different weight setting characteristics.

10. The method of claim 9, wherein at least one of the one or more clients receives a higher weight based on subscribing to a higher tier of service that is allocated more bandwidth.

11. The method of claim 9, wherein at least one of the one or more clients receives a higher weight based, at least in part, on a particular client attempting to fill its buffer or based, at least in part, on a channel change operation involving the particular client.

12. The method of claim 9, wherein at least one of the one or more clients receives a higher weight based on a relative encoding characteristic of a scene being displayed on a particular client.

13. The method of claim 9, wherein at least one set of weights are designated based on the one or more clients adapting their requested bandwidth weights in an auction protocol in which resulting bandwidth shares converge on a point at which a marginal utility for additional bandwidth for each of the one or more clients is substantially equal.

14. The method of claim 8, wherein at least one set of weights is based on a complexity parameter that involves an encoding rate and at least one distortion characteristic associated with a particular TCP flow.

15. The method of claim 1, further comprising, prior to marking, determining the fraction based on a combination of the RTT value for the TCP flow and the threshold value.

16. One or more non-transitory tangible media that includes code for execution and when executed by a processor operable to perform operations comprising:
    generating a transmission control protocol (TCP) flow;
    marking a plurality of packets of the TCP flow with one of two differentiated services code points (DSCPs) according to a proportion that is selected to control a throughput associated with the TCP flow, the marking comprising:
        when it is determined that a round-trip time (RTT) value for the TCP flow is less than or equal to a threshold value, marking all of the plurality of packets with a first DSCP of the two DSCPs,
        when it is determined that the RTT value for the TCP flow is greater than the threshold value, marking only a fraction of the plurality of packets with the first DSCP of the two DSCPs, and
        wherein the two DSCPs reflect a HiDrop priority and a LoDrop priority within a Diffsery priority; and
    communicating at least a portion of the plurality of packets to a network.

17. A network element, comprising:
    a processor;
    a memory; and
    a module, wherein the module is configured to:
        generate a transmission control protocol (TCP) flow;
        mark a plurality of packets of the TCP flow with one of two differentiated services code points (DSCPs) according to a proportion that is selected to control a throughput associated with the TCP flow, the marking comprising:
            when it is determined that a round-trip time (RTT) value for the TCP flow is less than or equal to a threshold value, marking all of the plurality of packets with a first DSCP of the two DSCPs,
            when it is determined that the RTT value for the TCP flow is greater than the threshold value, marking only a fraction of the plurality of packets with the first DSCP of the two DSCPs, and
            wherein the two DSCPs reflect a HiDrop priority and a LoDrop priority within a Diffsery priority; and
        communicate at least a portion of the plurality of packets to a network.

* * * * *